J. RICHARDS & G. RICHARDS.
Boring-Machine.

No. 159,279. Patented Feb. 2, 1875.

Witness.

Inventors.
John Richards
George Richards

UNITED STATES PATENT OFFICE.

JOHN RICHARDS, OF PHILADELPHIA, PENNSYLVANIA, AND GEORGE RICHARDS, OF GOTHENBURG, SWEDEN.

IMPROVEMENT IN BORING-MACHINES.

Specification forming part of Letters Patent No. 159,279, dated February 2, 1875; application filed December 29, 1874.

*To all whom it may concern:*

Be it known that we, JOHN RICHARDS, of Philadelphia, Pennsylvania, and GEORGE RICHARDS, of Gothenburg, Kingdom of Sweden, have invented an Improvement in Boring-Machines, and manner of driving the same, of which the following is a specification:

The nature of this invention consists in certain improvements in the manner of arranging and driving the spindles in boring-machines where three spindles are employed, and has for its object to simplify the driving mechanism, the avoidance of noise from gear-wheels, and the greater endurance of the parts.

The spindles of boring-machines, when set in a vertical position, have hitherto been in most cases driven by means of bevel-gear wheels that change the angle of motion from horizontal driving-shafts to the vertical boring-spindles. Such gearing can be driven only at a limited speed, causes undue strain upon the bearings, and is open to various objections, which the invention herein described seeks to avoid.

Figure 3:
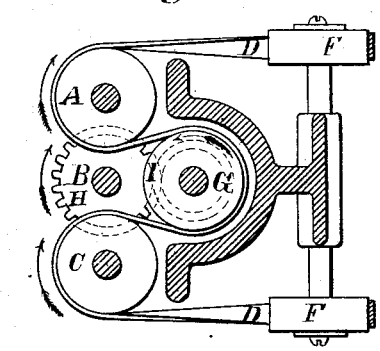
Figure 2:
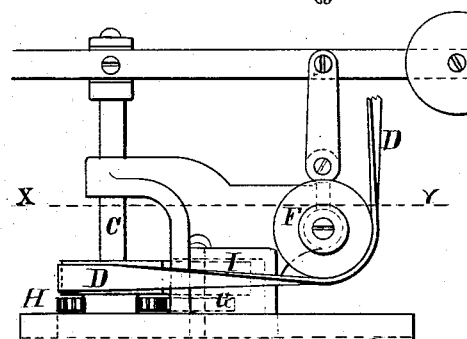
Figure 1:
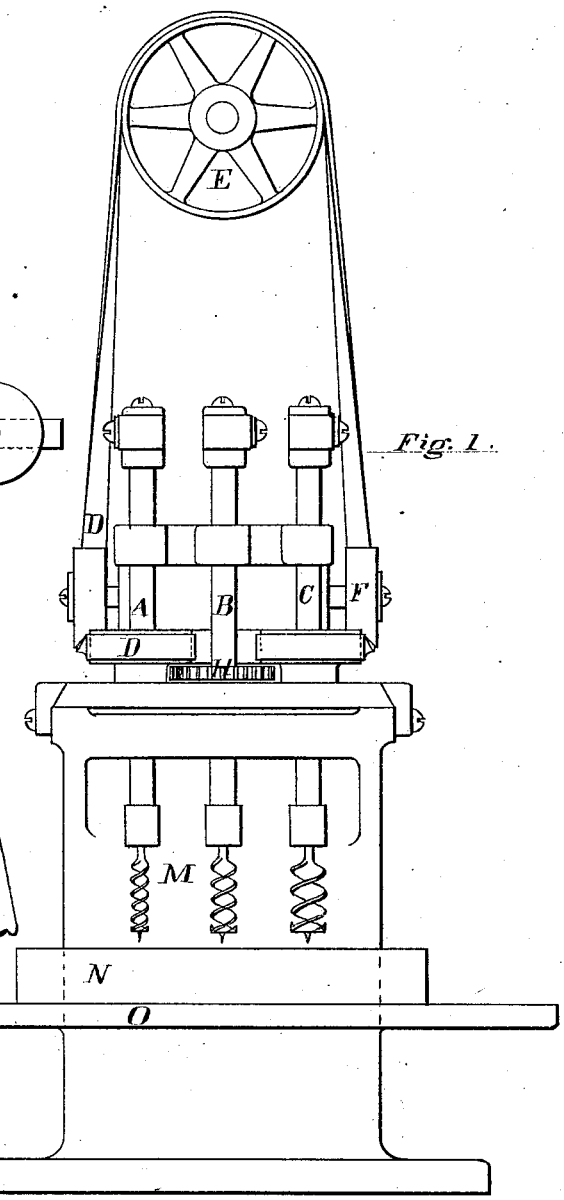

Figure 1 is a front elevation of a boring-machine with three spindles embodying our improvements. Fig. 2 is a partial side view of Fig. 1. Fig. 3 is a section on the line X Y of Fig. 2.

The two outside spindles A and C are driven by the belt D, which passes over the overhead counter-shaft pulley E, around the two idle-pulleys F, then around the pulleys on the spindles A and C and the pulley E, as indicated by the arrows in Fig. 3. The central spindle, B, is driven by means of a pair of spur gear-wheels shown by the dotted lines, Fig. 3, one of the gear-wheels, H, being attached to the spindle B, and the other, G, to the pulley I.

By this arrangement it may be seen that all the spindles, A, B, and C, are driven in the same direction by the same belt, and that but one pair of gear-wheels are required. The gearing can be so arranged that the central spindle, B, will revolve slower or faster than the other two, A and C, so as to drive a larger or smaller auger or other tool, as the nature of the work may require, and as the proportions between the wheels H and G may determine.

This invention is applicable to machines for boring any kind of material when three separate spindles are required. M is the main frame to support the machinery; O, the table or carriage to support the material, and N the material to be bored. These latter details are of course varied to suit the nature of the work, and correspond to common practice in constructing machines of this class.

We claim as our invention—

The combination of three spindles in a boring-machine, when arranged and driven in the manner substantially as hereinbefore described.

JOHN RICHARDS.
GEORGE RICHARDS.

Witnesses:
WM. S. KELLEY,
L. H. BERRY.